United States Patent
Yoshinari (10) Patent No.: US 7,363,445 B2
(45) Date of Patent: Apr. 22, 2008

(54) BACKUP METHOD

(75) Inventor: Noriyuki Yoshinari, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 102 days.

(21) Appl. No.: 10/862,435

(22) Filed: Jun. 8, 2004

(65) Prior Publication Data

US 2005/0251635 A1    Nov. 10, 2005

(30) Foreign Application Priority Data

Apr. 15, 2004    (JP) .............................. 2004-119868

(51) Int. Cl.
*G06F 13/368* (2006.01)
(52) U.S. Cl. ...................... 711/162; 711/161; 711/154
(58) Field of Classification Search ................ None
See application file for complete search history.

(56) References Cited

U.S. PATENT DOCUMENTS

| | | | |
|---|---|---|---|
| 6,311,213 B2 * | 10/2001 | Dawson et al. ............. | 709/217 |
| 6,691,117 B2 * | 2/2004 | Ellison et al. ............... | 707/10 |
| 6,728,751 B1 * | 4/2004 | Cato et al. .................. | 709/202 |
| 6,810,491 B1 | 10/2004 | Yamamoto et al. | |
| 6,978,294 B1 * | 12/2005 | Adams et al. .............. | 709/217 |
| 2003/0065687 A1 | 4/2003 | Momiji et al. | |
| 2003/0233382 A1 | 12/2003 | Gemba et al. | |
| 2004/0172512 A1 | 9/2004 | Nakanishi et al. | |
| 2004/0186900 A1 | 9/2004 | Nakano et al. | |

FOREIGN PATENT DOCUMENTS

| | | |
|---|---|---|
| JP | 2001-051882 | 2/2001 |
| JP | 2002-215474 | 8/2002 |
| JP | 2003-223286 | 8/2003 |

OTHER PUBLICATIONS

Vapa, Mikko. Distributed Systems Replication. Apr. 2003. http://tisu.it.jyu.fi/embedded/TIE370/lectureslides/Replication.ppt.*

* cited by examiner

*Primary Examiner*—Gary Portka
*Assistant Examiner*—Michael B McFadden
(74) *Attorney, Agent, or Firm*—Mattingly, Stanger, Malur & Brundidge, PC (57) ABSTRACT

The invention provides a method of backing up data, in which plural information processing units connected to a network are not required to monitor each other, and autonomously send data to the other information processing units to buck up the data. The method, using the plural information processing units connected to the network collects information as to a possibility of backing up the data from the other plural information processing units connected to the network, adds addresses for identifying the other information processing units to collected information, and stores the collected information in a storage device. When the backup becomes necessary, the method sends a backup request to the other information processing units selected on the basis of the information stored in the storage device, and sends backup data to the other information processing units that returned to accept the backup request.

20 Claims, 10 Drawing Sheets

FIG. 1A
Inquire (UDP)

FIG. 1D
Accept Backup or
Decline Backup (TCP)

FIG. 1B
Inform (UDP)

FIG. 1E
Deposite Backup or
Refuse Backup (TCP)

FIG. 1C
Request Backup (TCP)

FIG. 1F
Deposite Manifest (TCP)

FIG. 2A
Set Manifest (UDP)

FIG. 2B
Request Restore (TCP)

FIG. 2C
Accept Restore or Late Restore (TCP)

FIG. 2D
Withdraw Restore (TCP)

FIG. 4

MEDIA INFORMATION MANAGEMENT TABLE 400

| IP ADDRESS | TYPE OF MEDIA | FREE DATA CAPACITY (GB) | DATA TRANSFER SPEED (MB/Sec) | DISTANCE ON NETWORK | POSSIBILITY OF ACCEPTING BACKUP REQUEST |
|---|---|---|---|---|---|
| 192.168.0.1 | HDD | 10 | 100 | 1 | Y |
| 192.168.0.3 | RAID UNIT | 4000 | 10 | 1 | Y |
| 192.168.0.7 | MAGNETIC TAPE | 100000 | 400 | 1 | Y |
| 192.168.1.10 | RAID UNIT | 8000 | 100 | 2 | Y |
| 192.168.0.13 | RAID UNIT | 6000 | 200 | 1 | N |
| 192.168.2.17 | HDD UNIT | 20 | 10 | 2 | N |
| 192.168.2.19 | HDD UNIT | 40 | 20 | 2 | Y |
| 192.168.8.21 | MAGNETIC TAPE | 300000 | 400 | 2 | N |
| 192.168.8.34 | RAID UNIT | 4000 | 200 | 2 | Y |
| 192.168.9.50 | RAID UNIT | 3000 | 150 | 2 | N |
| 192.168.9.60 | RAID UNIT | 2000 | 200 | 2 | Y |

FIG. 5

BACKUP MEDIA MANAGEMENT TABLE  500

| IP ADDRESS | TYPE OF MEDIA | FREE DATA CAPACITY (GB) | DATA TRANSFER SPEED (MB/Sec) |
|---|---|---|---|
| 192. 168. 0. 3 | RAID UNIT | 400 | 10 |
| 192. 168. 1. 10 | RAID UNIT | 800 | 100 |
| 192. 168. 0. 13 | RAID UNIT | 600 | 200 |
| 192. 168. 8. 34 | RAID UNIT | 4000 | 200 |
| 192. 168. 9. 50 | RAID UNIT | 2000 | 150 |
| 192. 168. 9. 60 | RAID UNIT | 2000 | 200 |
| DATA CAPACITY BACKUP OBJECT | 10000 | 9800 | |

FIG. 6

BACKUP MEDIA MANAGEMENT TABLE  500

| IP ADDRESS | TYPE OF MEDIA | FREE DATA CAPACITY (GB) | DATA TRANSFER SPEED (MB/Sec) |
|---|---|---|---|
| 192. 168. 0. 3 | RAID UNIT | 400 | 10 |
| 192. 168. 1. 10 | RAID UNIT | 800 | 100 |
| 192. 168. 0. 13 | RAID UNIT | 600 | 200 |
| 192. 168. 8. 34 | RAID UNIT | 4000 | 200 |
| 192. 168. 9. 50 | RAID UNIT | 2000 | 150 |
| 192. 168. 9. 55 | RAID UNIT | 1000 | 150 |
| 192. 168. 9. 60 | RAID UNIT | 2000 | 200 |
| DATA CAPACITY BACKUP OBJECT | 10000 | 10800 | |

FIG. 7

MANIFEST TABLE 700

| IP ADDRESS | BACKUP DATA MAP | TRANSFER START TIME (GMT) | TRANSFER TERMINATION TIME (GMT) | SUCCESS/ FAILURE FLAG |
|---|---|---|---|---|
| 192.168.0.3 | LU=1, Cyl=0, track=0 | 2003/8/29/10:55:01 | 2003/8/29/10:55:15 | Y |
| 192.168.0.3 | LU=1, Cyl=0, track=20 | 2003/8/29/10:55:16 | 2003/8/29/10:55:30 | Y |
| 192.168.0.3 | LU=1, Cyl=1, track=0 | 2003/8/29/10:55:31 | 2003/8/29/10:55:45 | Y |
| 192.168.0.3 | LU=1, Cyl=1, track=20 | 2003/8/29/10:55:46 | 2003/8/29/10:56:00 | Y |
| 192.168.0.3 | LU=1, Cyl=2, track=0 | 2003/8/29/10:56:01 | 2003/8/29/10:56:15 | Y |
| 192.168.0.3 | LU=1, Cyl=2, track=20 | 2003/8/29/10:56:16 | 2003/8/29/10:56:30 | Y |
| 192.168.0.3 | LU=1, Cyl=3, track=0 | 2003/8/29/10:56:31 | 2003/8/29/10:56:45 | Y |
| 192.168.0.3 | LU=1, Cyl=3, track=20 | 2003/8/29/10:56:46 | 2003/8/29/10:57:00 | Y |
| 192.168.0.3 | LU=1, Cyl=4, track=0 | 2003/8/29/10:57:02 | 2003/8/29/10:57:15 | Y |
| 192.168.0.3 | LU=1, Cyl=4, track=20 | 2003/8/29/10:57:17 | 2003/8/29/10:57:30 | Y |
| 192.168.0.3 | LU=1, Cyl=5, track=0 | 2003/8/29/10:57:32 | 2003/8/29/10:57:45 | Y |
| 192.168.0.3 | LU=1, Cyl=5, track=20 | 2003/8/29/10:57:47 | 2003/8/29/10:58:00 | Y |
| 192.168.0.4 | LU=1, Cyl=6, track=0 | 2003/8/29/10:58:01 | 2003/8/29/10:58:15 | Y |
| 192.168.0.4 | LU=1, Cyl=6, track=20 | 2003/8/29/10:58:16 | 2003/8/29/10:58:30 | Y |
| 192.168.0.4 | LU=1, Cyl=7, track=0 | 2003/8/29/10:58:31 | 2003/8/29/10:58:45 | Y |
| 192.168.0.4 | LU=1, Cyl=7, track=20 | 2003/8/29/10:58:46 | 2003/8/29/10:59:00 | Y |
| 192.168.0.4 | LU=1, Cyl=8, track=0 | 2003/8/29/10:59:03 | 2003/8/29/10:59:18 | Y |
| 192.168.0.4 | LU=1, Cyl=8, track=20 | 2003/8/29/10:59:18 | 2003/8/29/10:59:33 | Y |
| 192.168.0.4 | LU=1, Cyl=9, track=0 | 2003/8/29/10:59:33 | 2003/8/29/10:59:48 | Y |
| 192.168.0.4 | LU=1, Cyl=9, track=20 | 2003/8/29/10:59:48 | 2003/8/29/11:00:00 | Y |
| 192.168.0.4 | LU=1, Cyl=10, track=0 | 2003/8/29/11:00:01 | 2003/8/29/11:00:15 | Y |
| 192.168.0.4 | LU=1, Cyl=10, track=20 | 2003/8/29/11:00:16 | 2003/8/29/11:00:30 | Y |
| 192.168.0.4 | LU=1, Cyl=10, track=0 | 2003/8/29/11:00:31 | 2003/8/29/11:00:45 | Y |
| 192.168.0.4 | LU=1, Cyl=10, track=20 | 2003/8/29/11:00:46 | 2003/8/29/11:01:00 | Y |

FIG. 8

DEPOSIT TABLE 800

| IP ADDRESS | BACKUP DATA MAP | RECEIVE START TIME (GMT) | RECEIVE TERMINATION TIME (GMT) | SUCCESS/ FAILURE FLAG |
|---|---|---|---|---|
| 192. 168. 0. 1 | LU=1, Cyl=0, track=0 | 2003/8/29/10:55:01 | 2003/8/29/10:55:15 | Y |
| 192. 168. 0. 1 | LU=1, Cyl=0, track=20 | 2003/8/29/10:55:16 | 2003/8/29/10:55:30 | Y |
| 192. 168. 0. 5 | LU=1, Cyl=0, track=0 | 2003/8/29/10:55:31 | 2003/8/29/10:55:45 | Y |
| 192. 168. 0. 5 | LU=1, Cyl=0, track=20 | 2003/8/29/10:55:46 | 2003/8/29/10:56:00 | Y |
| 192. 168. 0. 1 | LU=1, Cyl=1, track=0 | 2003/8/29/10:56:01 | 2003/8/29/10:56:15 | Y |
| 192. 168. 0. 1 | LU=1, Cyl=1, track=20 | 2003/8/29/10:56:16 | 2003/8/29/10:56:30 | Y |
| 192. 168. 0. 5 | LU=1, Cyl=1, track=0 | 2003/8/29/10:56:31 | 2003/8/29/10:56:45 | Y |
| 192. 168. 0. 5 | LU=1, Cyl=1, track=20 | 2003/8/29/10:56:46 | 2003/8/29/10:57:00 | Y |
| 192. 168. 0. 5 | LU=1, Cyl=2, track=0 | 2003/8/29/10:57:02 | 2003/8/29/10:57:15 | Y |
| 192. 168. 0. 5 | LU=1, Cyl=2, track=20 | 2003/8/29/10:57:17 | 2003/8/29/10:57:30 | Y |
| 192. 168. 0. 1 | LU=1, Cyl=2, track=0 | 2003/8/29/10:57:32 | 2003/8/29/10:57:45 | Y |
| 192. 168. 0. 1 | LU=1, Cyl=2, track=20 | 2003/8/29/10:57:47 | 2003/8/29/10:58:00 | Y |
| 192. 168. 0. 1 | LU=1, Cyl=3, track=0 | 2003/8/29/10:58:01 | 2003/8/29/10:58:15 | Y |
| 192. 168. 0. 5 | LU=1, Cyl=3, track=20 | 2003/8/29/10:58:16 | 2003/8/29/10:58:30 | Y |
| 192. 168. 0. 1 | LU=1, Cyl=3, track=20 | 2003/8/29/10:58:31 | 2003/8/29/10:58:45 | Y |
| 192. 168. 0. 5 | LU=1, Cyl=3, track=0 | 2003/8/29/10:58:46 | 2003/8/29/10:59:00 | Y |
| 192. 168. 0. 1 | LU=1, Cyl=4, track=0 | 2003/8/29/10:59:03 | 2003/8/29/10:59:18 | Y |
| 192. 168. 0. 1 | LU=1, Cyl=4, track=20 | 2003/8/29/10:59:18 | 2003/8/29/10:59:33 | Y |
| 192. 168. 0. 1 | LU=1, Cyl=5, track=0 | 2003/8/29/10:59:33 | 2003/8/29/10:59:48 | Y |
| 192. 168. 0. 1 | LU=1, Cyl=5, track=20 | 2003/8/29/10:59:48 | 2003/8/29/11:00:00 | Y |
| 192. 168. 0. 1 | LU=1, Cyl=6, track=0 | 2003/8/29/11:00:01 | 2003/8/29/11:00:15 | Y |
| 192. 168. 0. 1 | LU=1, Cyl=6, track=20 | 2003/8/29/11:00:16 | 2003/8/29/11:00:30 | Y |
| 192. 168. 0. 1 | LU=1, Cyl=7, track=0 | 2003/8/29/11:00:31 | 2003/8/29/11:00:45 | Y |
| 192. 168. 0. 1 | LU=1, Cyl=7, track=20 | 2003/8/29/11:00:46 | 2003/8/29/11:01:00 | Y |

FIG. 9A

| MESSAGE TYPE (Restore Request) | IP ADDRESS OF OWN MEDIA |

| MESSAGE TYPE (Accept Restore) | IP ADDRESS OF OWN MEDIA |

| MESSAGE TYPE (Late Restore) | IP ADDRESS OF OWN MEDIA |

| MESSAGE TYPE (With Draw Restore) | IP ADDRESS OF OWN MEDIA | PHYSICAL LOCATION OF DATA OF OWN MEDIA OR LOGICAL FILE NAME WITH ABSOLUTE PATH | BACKUP DATA BODY |

RESTORATION MANAGEMENT TABLE 1000

| IP ADDRESS | BACKUP DATA MAP | TRANSFER START TIME (GMT) | TRANSFER TERMINATION TIME (GMT) | RESTORABILITY FLAG |
|---|---|---|---|---|
| 192. 168. 0. 3 | LU=1, Cyl=0, track=0 | 2003/8/29/13:55:01 | 2003/8/29/13:55:15 | Y |
| 192. 168. 0. 3 | LU=1, Cyl=0, track=20 | 2003/8/29/13:55:16 | 2003/8/29/13:55:30 | Y |
| 192. 168. 0. 3 | LU=1, Cyl=1, track=0 | 2003/8/29/13:55:31 | 2003/8/29/13:55:45 | Y |
| 192. 168. 0. 3 | LU=1, Cyl=1, track=20 | 2003/8/29/13:55:46 | 2003/8/29/13:56:00 | Y |
| 192. 168. 0. 3 | LU=1, Cyl=2, track=0 | 2003/8/29/13:56:01 | 2003/8/29/13:56:15 | Y |
| 192. 168. 0. 3 | LU=1, Cyl=2, track=20 | 2003/8/29/13:56:16 | 2003/8/29/13:56:30 | Y |
| 192. 168. 0. 3 | LU=1, Cyl=3, track=0 | 2003/8/29/13:56:31 | 2003/8/29/13:56:45 | Y |
| 192. 168. 0. 3 | LU=1, Cyl=3, track=20 | 2003/8/29/13:56:46 | 2003/8/29/13:57:00 | Y |
| 192. 168. 0. 3 | LU=1, Cyl=4, track=0 | 2003/8/29/13:57:02 | 2003/8/29/13:57:15 | Y |
| 192. 168. 0. 3 | LU=1, Cyl=4, track=20 | 2003/8/29/13:57:17 | 2003/8/29/13:57:30 | Y |
| 192. 168. 0. 3 | LU=1, Cyl=5, track=0 | 2003/8/29/13:57:32 | 2003/8/29/13:57:45 | Y |
| 192. 168. 0. 3 | LU=1, Cyl=5, track=20 | 2003/8/29/13:57:47 | 2003/8/29/13:58:00 | Y |
| 192. 168. 0. 4 | LU=1, Cyl=6, track=0 | | | Y |
| 192. 168. 0. 4 | LU=1, Cyl=6, track=20 | | | Y |
| 192. 168. 0. 4 | LU=1, Cyl=7, track=0 | | | Y |
| 192. 168. 0. 4 | LU=1, Cyl=7, track=20 | | | Y |
| 192. 168. 0. 4 | LU=1, Cyl=8, track=0 | | | Y |
| 192. 168. 0. 4 | LU=1, Cyl=8, track=20 | | | Y |
| 192. 168. 0. 4 | LU=1, Cyl=9, track=0 | | | Y |
| 192. 168. 0. 4 | LU=1, Cyl=9, track=20 | | | Y |
| 192. 168. 0. 4 | LU=1, Cyl=10, track=0 | | | Y |
| 192. 168. 0. 4 | LU=1, Cyl=10, track=20 | | | Y |
| 192. 168. 0. 4 | LU=1, Cyl=10, track=0 | | | Y |
| 192. 168. 0. 4 | LU=1, Cyl=10, track=20 | | | Y |

FIG. 11

BACKUP METHOD

CROSS-REFERENCE TO RELATED APPLICATION

The present application claims priority from Japanese application JP 2004-119868 filed on Apr. 15, 2004, the content of which is hereby incorporated by reference into this application.

BACKGROUND OF THE INVENTION

The present invention relates to a method of backing up data, specifically to a method of mutually backing up data by use of plural information processing units connected to a network, a method of restoring backed-up data, and a system of the same.

It is a common practice to connect information processing units such as computers and storage devices to a network, and to process information while exchanging data between these units. Some storage devices for recording bulk data employ the RAID (Redundancy Arrays Of Inexpensive Disks) these days, and practically use the management technique that integrates the storage devices while using the SAN (Storage Area Network) with the NAS (Network Attached Storage). These information processing units such as computers and storage devices can write and read data, and they are often referred to as media. As long as it can write and read data, the media include an information processing unit that is not necessarily connected to a network.

A general behavior prepares the so-called backup of retaining the copies of currently used data in the other media, in order to prevent the data from disappearing, or to ensure the security of the data. When the media is connected to a network, the backup of data in general automatically stores the data in a different medium by a computer or a timer issuing a periodic trigger. When the medium is not connected to a network, on the other hand, the operator manually issues a trigger for the backup to retain the data in a different medium.

In this method, the medium being the storage unit destined for the backup data, or the backup time is settled in advance. Accordingly, in an accident or a disaster, since the medium destined for the backup or the backup time is settled, there is a fear that this method cannot make the backup of the data, and can lose the data.

As the technique to back up data in the media utilizing a network, the Japanese Published Unexamined Patent Application No. 2002-215474, for example, proposes a technique to back up data on a network to which plural servers are connected. This method creates a mirror of the data in more than two servers connected with the network, in which the plural servers monitor the situations of themselves each other. As a result of the monitoring, when detecting an abnormality in one server, the method makes the servers cooperate to find out a server having sufficient storage capacity, determines a substitutive server, and transfers the data to the substitutive server to store the data. In this manner, the above technique discloses a backup system, in which plural backup servers are always formed.

The Japanese Published Unexamined Patent Application No. 2003-223286 proposes a storage system provided with an autonomously functional storage device, whereby a management server is made unnecessary. That is, in the storage system, a copy agent possesses the duplicate function of a copying unit, a monitoring unit monitors the multiplicity of the copying unit, and when the multiplicity is insufficient, the system issues a duplicate request to other storage devices.

The technique disclosed in the Japanese Published Unexamined Patent Application No. 2002-215474 searches for a substitutive server having a margin in the storage capacity, and sends the data to the substitutive server having the margin. However, this technique requires the substitutive server to monitor the multiplicity of the copying unit in the other storage devices. The Japanese Published Unexamined Patent Application No. 2002-215474 does not disclose a concrete method how to search for the substitutive server having the margin.

The technique disclosed in the Japanese Published Unexamined Patent Application No. 2003-223286 saves the management server; however, the technique needs to autonomously monitor the other storage devices. The Japanese Published Unexamined Patent Application No. 2003-223286 does not relate how to restore the data having been backed up.

SUMMARY OF THE INVENTION

Accordingly, the present invention provides a method of backing up data, in which plural information processing units connected to a network are not required to monitor each other, and autonomously send data to the other information processing units to buck up the data.

The invention also provides a method of restoring backed-up data which autonomously restores the data having been backed up in the other information processing units in an original information processing unit.

According to one aspect of the invention, the method of backing up data uses plural information processing units connected to a network, which includes the steps of: collecting information as to a possibility of backing up the data from the other plural information processing units connected to the network, adding addresses for identifying the other information processing units to collected information, and storing the collected information in a storage device, sending a backup request to the other information processing units selected on the basis of the information stored in the storage device, when the backup becomes necessary, and sending backup data to the other information processing units that returned to accept the backup request.

As a preferable example, the method includes the steps of: sending a first message for inquiry to a network from a first information processing unit, returning a second message containing information as to a possibility of backing up the data to the first information processing unit from a second information processing unit that received the first message, creating a first table on the basis of the second message by the first information processing unit, which manages at least information relating to the second information processing unit capable of backing up the data, and retaining the table in a storage device, sending backup data to the second information processing unit being a recipient of the backup data, selected from the first table, and creating a second table for managing information including an address of the second information processing unit having been the recipient of the backup data, and retaining the table in the storage device inside the first information processing unit.

The above second message includes a type of a medium that the second information processing unit possesses, a free capacity of the medium, and information as to whether a backup request can be accepted, and the first table registers an address that specifies the second information processing unit, the type of the medium, the free capacity of the medium, and the information as to whether a backup request can be accepted.

The above second table preferably registers at least the address of the second information processing unit that sent the backup data, and information indicating success or failure of the backup.

And, the second information processing unit that received the backup data from the first information processing unit preferably creates a third table that registers at least an address of the first information processing unit having been a recipient of the backup data, and the information indicating success or failure of the backup, and retains the table in the storage device.

And, before sending the backup data to the second information processing unit being the recipient of the backup data from the first information processing unit, the method preferably includes the steps of: selecting a second information processing unit being a backup object with reference to the first table, and sending a backup request message to the second information processing unit, and receiving a return message as to whether the backup request can be accepted or not from the second information processing unit.

In regard to restoring backed-up data, the first information processing unit requests, referring to the second table, to transfer the backup data to the second information processing unit having been the recipient of the backup data, receives the backup data sent from the second information processing unit, and stores the backup data in the storage device inside the first information processing unit.

The invention can be recognized as a program for executing the steps of the method of backing up data or the method of restoring data.

The invention can also be recognized as an information processing unit that executes the backup processing and the restoration processing. That is, the information processing unit connected to a network, sends and receives data to and from other plural information processing units, which includes: a CPU that executes data processing, a recording medium that stores data processed by the CPU, a nonvolatile memory that stores at least management information for bucking up data, and a communication port connected the network and paths to connect the units. The communication port sends a first message for acquiring state information of the other information processing units to the network, and receives a second message including information as to a possibility of backing up the data, sent from the other information processing units. The nonvolatile memory or the recording medium retains a first table, created on the basis of the second message, that manages information relating to the other information processing units being at least capable of bucking up the data. The CPU selects, in an abnormal state, the other information processing units being the recipients of the backup data referring to the first table, issues a backup request to the other information processing units, executes processing for sending the data stored in the recording medium to the other information processing units that accepted the backup request, and creates a second table for managing information including addresses of the other information processing units having been the recipients of the backup data. The nonvolatile memory or the recording medium retains the second table.

According to this invention, the plural information processing units connected to the network are not required to monitor each other, and it is possible to autonomously transfer the backup data to the other information processing units, and to archive the data. Also, it is easy to restore the data backed up in the other information processing units.

According to a preferable example, it is possible that the information processing units mutually communicate the state information of theirs, including the free capacity for storing data through the network, and that a certain information processing unit having an abnormality detected searches for other information processing units that are suitable with reference to the state information to thereby transfer the backup data to the other information processing units.

BRIEF DESCRIPTION OF THE DRAWINGS

FIG. 7 illustrates a configuration of a manifest table 700 of the embodiment, which manages the information of the recipient of the backup request;

FIG. 8 illustrates a configuration of a deposit table 800 of the embodiment, which manages the information of the originator of the backup request;

FIG. 10 illustrates a configuration of a recovery management table 1000 of the backup data in the embodiment.

DESCRIPTION OF THE EMBODIMENTS

The embodiment will now be described with reference to the accompanying drawings.

FIG. 1 illustrates a schematic configuration and an operational process of the automatic backup system in one embodiment of the present invention.

Media 101 through 105, which can be represented by 101, are connected each other through a network 100. These plural media 101 each have the IP address inherent to them each, and sends/receives data each other between the media. Here, the media signify the information processing units such as computers and storage devices.

Figure 11:
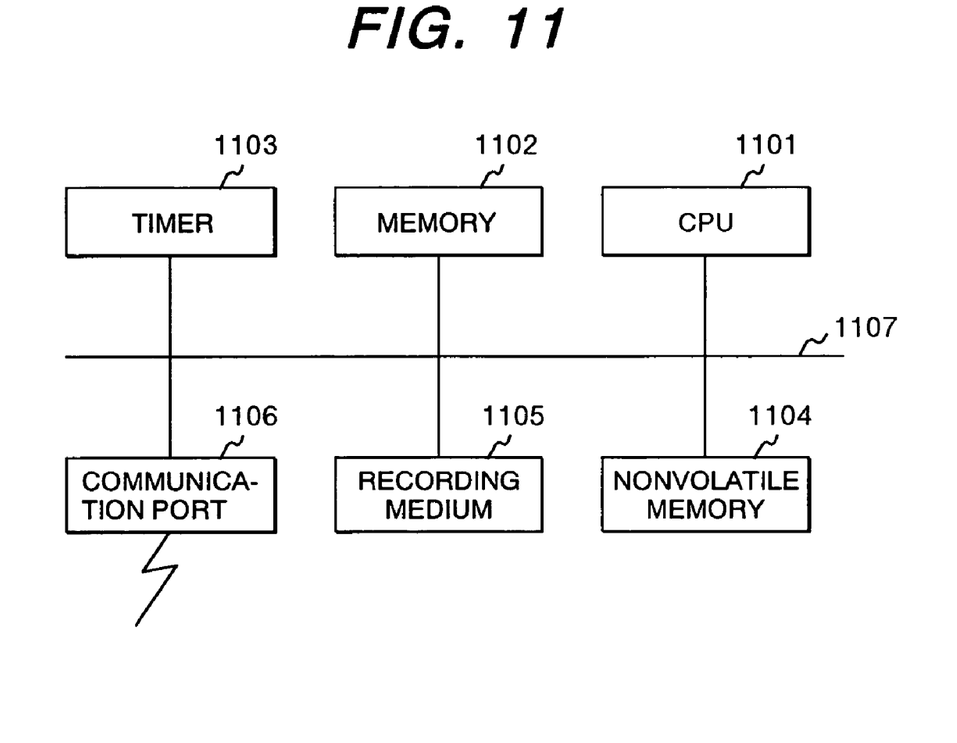
FIG. 11 illustrates a configuration of the media of the automatic backup system in the embodiment.

FIG. 11 illustrates a configuration of the media.

Each of the media possesses a CPU 1101 that executes information processing, a memory 1102 that stores data and programs for the information processing, a timer 1103 having the timer function, a nonvolatile memory 1104, a recording medium 1105, a communication port 1106 that connects these media to the network 100; and these units are connected with a bus or a LAN 1107. Here, the nonvolatile memory 1104 archives various types of management tables, which are represented by the table (the manifest table, described later) for managing the management information relating to the backup, for example, the information including the IP address and the data transfer capacity of the medium being the recipient of the backup request. The manifest will be explained later. The recording medium 1105 is a storage device for storing the backup data as well as the data and programs for the data processing, which includes, for example, a RAID unit, a magnetic tape unit, and an HDD and so forth.

The CPU 1101 possesses an abnormality detection function that detects an abnormality of the own medium 101 at each constant time intervals, and a function that monitors a free data capacity in the recording medium 1105. The information of the free data capacity obtained by the monitoring is retained in the memory 1102. Here, the abnormality of the device signifies the fault resulting from the hardware and software. For example, if there occurs a write/read error to a storage device, which cannot be restored after specific frequency of retrials, the error is regarded as the abnormality of the device.

As the feature of this embodiment, each of the media 101 has the program in the memory 1102, which realizes the protocol for mutually sending/receiving, through the network 100, the state information that includes the state of the device of the own media, free data capacity of the storage device, data transfer speed, and IP address. In the normal state, each of the media 101 is carrying out a designated application with the CPU 1101, and executes the processing according to this protocol when the backup becomes necessary.

In the processing according to this protocol, each of the media 101 sends the request for acquiring the state information of the other media periodically to the network 100. The other media 101 send the state information of the media of its own to the other media according to this protocol. Carrying out the above process, each of the media 101 creates or updates the media information management table 400 (FIG. 4) described later, and retains it in the nonvolatile memory of its own, for example, in the manifest I/O device 1104.

Figure 1A:
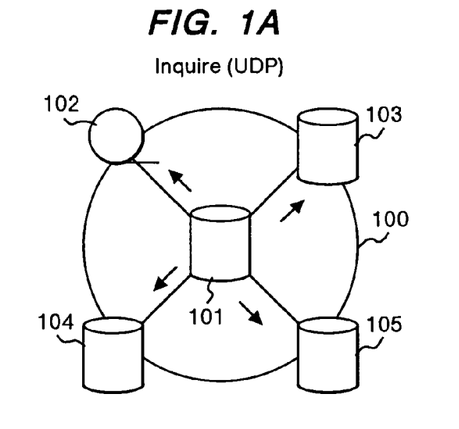
FIG. 1 illustrates a schematic configuration and an operational process of the automatic backup system in one embodiment of the present invention.
Figures 3A, 3B:
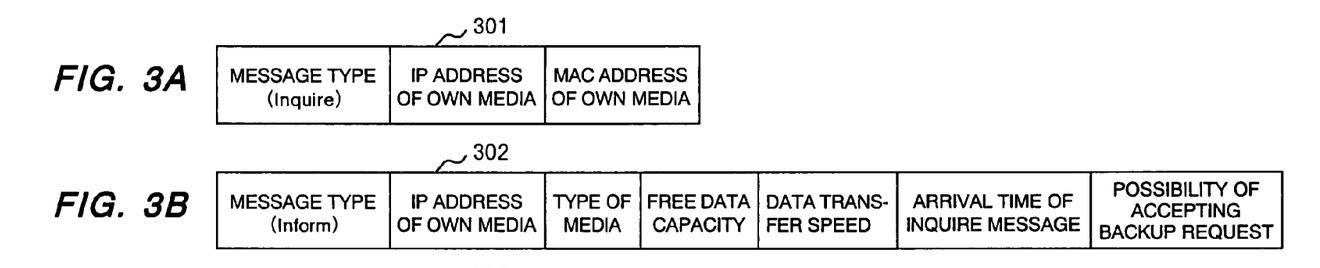
FIG. 3 illustrates the electronic mail protocol used in the backup system in the embodiment.

When a specific one of the media 101 detects an abnormality of the own device, the media 101 broadcasts an Inquire message according to the UDP protocol, for example, to the other media 102 to 105 through the network 100 (FIG. 1A). The Inquire message 301 is composed of, as shown in FIG. 3A, 'Inquire' as the message type, IP address of the own medium, and MCA address of the own medium.

Figure 1B:
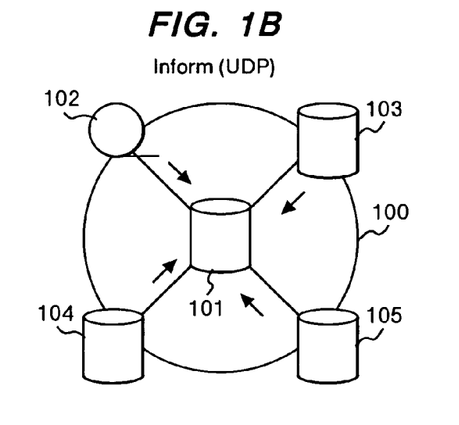

Next, as shown in FIG. 1B, the other media 102 to 105 having received the Inquire message 301 create an Inform message 302, and broadcast it to the network 100 by the UDP protocol, for example. The Inform message 302 includes, as shown in FIG. 3B, the message type 'Inform' at the leading, IP address of the own medium, type of the medium, free data capacity that can be provided for the backup, data transfer speed of the own medium, arrival time of the Inquire message, and possibility of accepting the backup request.

The type of the medium shows the type of the storage device, for example, HDD (Hard Disk Drive), RAID (Redundant Arrays Of Inexpensive Disks), or magnetic tape. The free date capacity shows the latest free data capacity of the storage device. The possibility of accepting the backup request shows yes or no as to hiring out the storage device of a certain medium for the retention of the backup data of the other media. When there is a margin in the storage capacity of the storage device of the medium, it is expected that the margin is hired out to the others.

Figure 4:
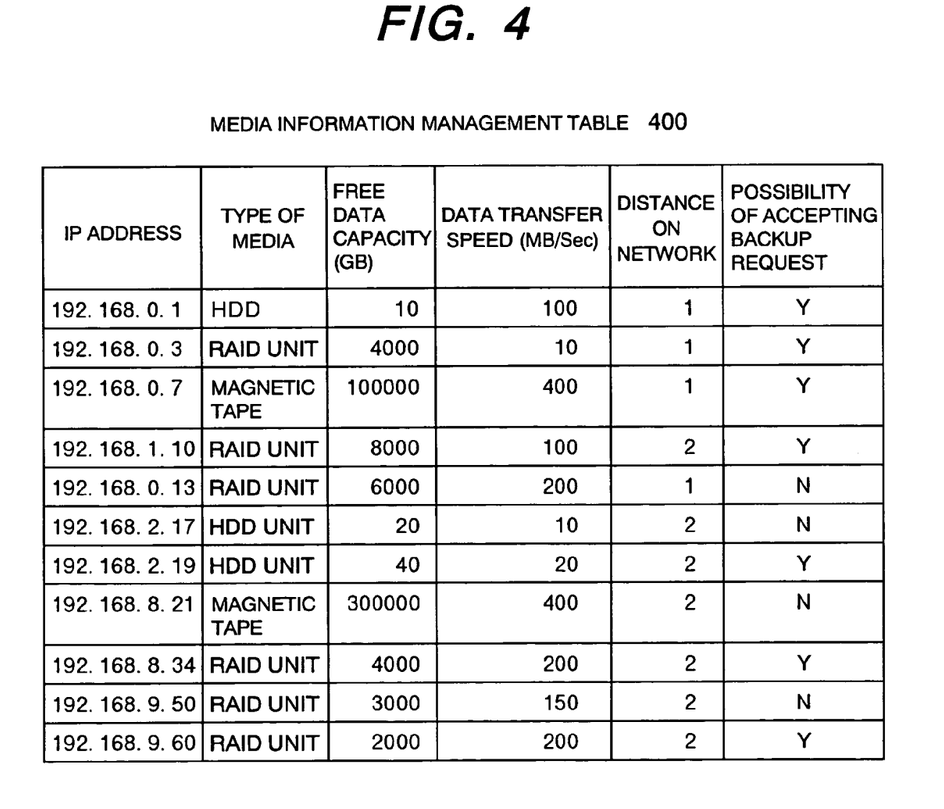
FIG. 4 illustrates a configuration of a media information management table 400 of the embodiment, which registers the other media information.

While mutually exchanging the Inquire message and the Inform message between the media 101 to 105, each of the media 101 to 105 analyzes the Inform message, and builds up the media information management table 400 as shown in FIG. 4. This table is registered in the storage device of each medium.

In FIG. 4, the media information management table 400 is registered in the storage device of a nonvolatile memory and the like, in the order of receiving the Inform message. That is, the information of the type of the media, free data capacity, data transfer speed, distance on the network, and possibility of accepting the backup request are stored in correspondence with each of the IP addresses of the media of the originators. Here, the distance on the network represents the distance obtained by calculating the path until the medium as the transfer destination of data, by means of, for example, the metric used in the routing of data on the network. The processing up to here may be executed at each given constant intervals, by use of the timer 1103, CPU 1101, and memory 1102.

Now, suppose that the media 101 detects a hardware error of its own. Here, referring to the table shown in FIG. 4, the medium 101 judges the error condition of the own medium, and selects the most appropriate medium to itself among the other media as a candidate for the backup recipient. For example, the medium of which type is the RAID, the medium of which data transfer speed is high, the medium of which free data capacity is abundant, the medium of which distance on the network is short, the medium on the same network address, and the media with the above conditions combined are selected as the candidate.

Figure 1C:
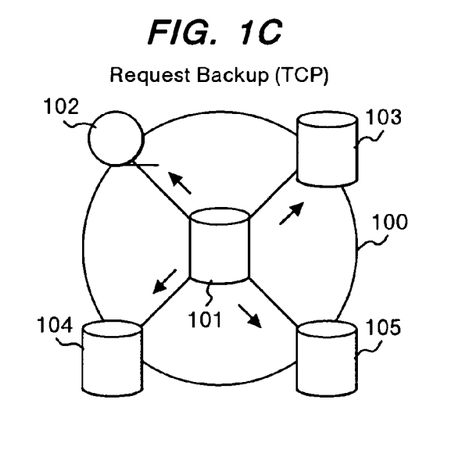
Figure 1D:
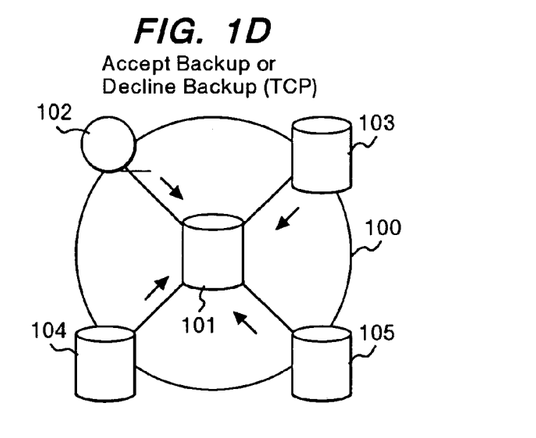
Figure 1E:
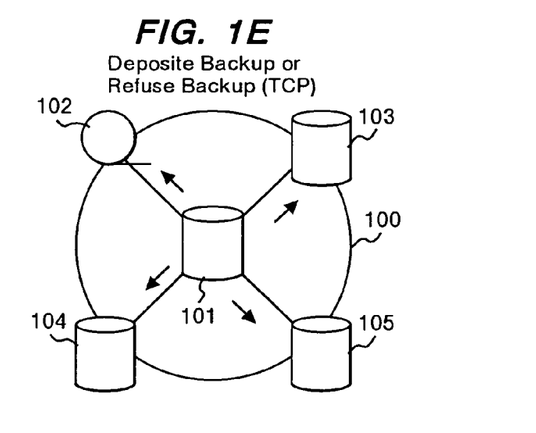
Figures 3C, 3D, 3E, 3F:
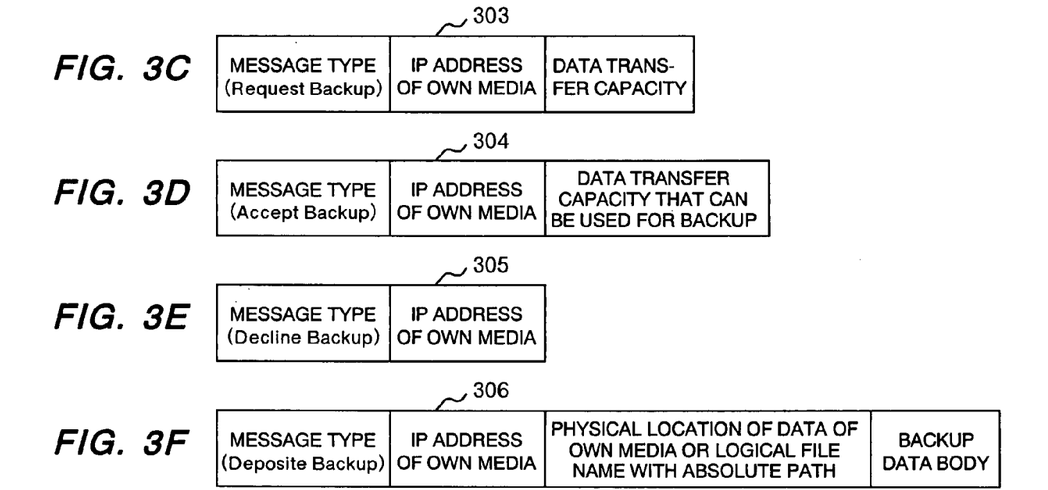

Next, as shown in FIG. 1C, the medium 101 sends a Request Backup message 303 to the other media selected as the backup recipient by the TCP protocol, for example. Here, the Request Backup message 303 is composed of, as shown in FIG. 3C, the message type Request Backup at the leading, IP address of the own medium, and data transfer capacity required for the backup.

The other media 102 to 105 having received the Request Backup message judge whether the backup of the requested data capacity is acceptable or not, from the operational conditions of the own media. If the judgment result shows that the backup request is acceptable, the media return an Accept Backup message 304. Here, the Accept Backup message 304 includes, as shown in FIG. 3D, the message type Accept Backup, IP address of the own medium, and data transfer capacity that can be used for the backup. Here, the medium 101 to which the message 304 should be sent back can be identified with reference to the IP address inside the received Request Backup message 303.

On the contrary, if the judgment result shows that the backup request is not acceptable, for example, if the free data capacity of the storage device is insufficient, the media return a Decline Backup message 305. Here, the Decline Backup message 305 is composed of, as shown in FIG. 3E, the message type Decline Backup and IP address of the own medium.

The medium 101 receives the Accept Backup message 304 or the Decline Backup message 305, and registers the contents of the received Accept Backup message 304 on a backup media management table 500.

Figure 5:
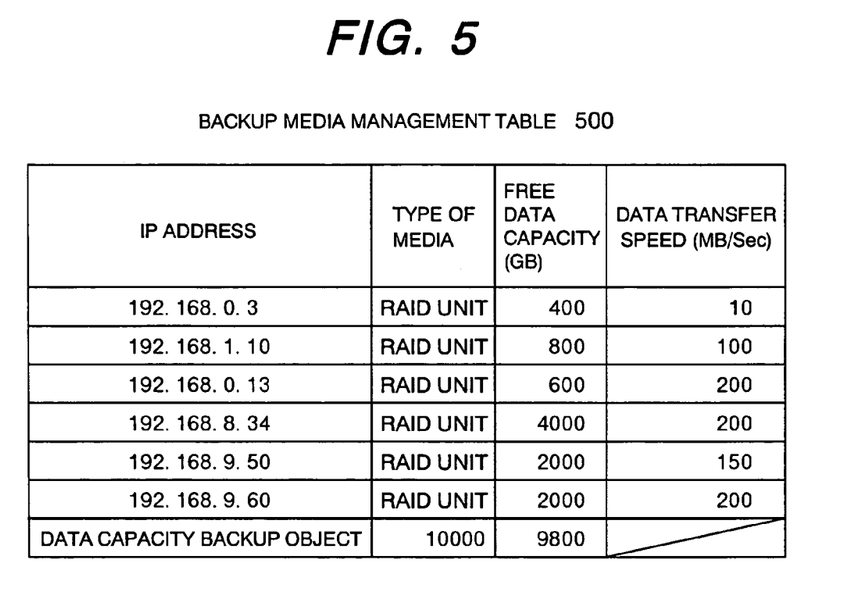
FIG. 5 illustrates a configuration of a backup media management table 500 of the embodiment, which manages the information of the media capable of backup.

The backup media management table 500 is to register the information of the other media that can be an object for the backup, and as shown in FIG. 5, the table registers the information relating to the acquired IP address of the other media, type of the medium, data transfer capacity, and data transfer speed. Here, the information except for the data transfer capacity is acquired from the media information management table 400 as shown in FIG. 4. The backup media management table 500 additionally registers the total quantity of data that the own medium 101 has to back up, and the acquired current total quantity of the backup data of the other media. The backup media management table 500 is built up in each of the media through the same process.

Figure 6:
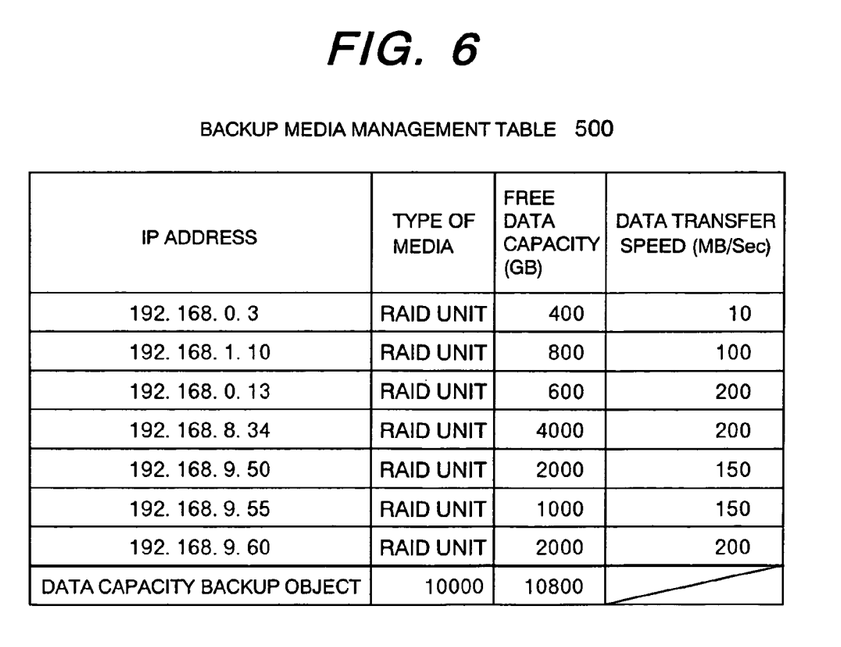
FIG. 6 illustrates a configuration of a backup media management table 500 of the embodiment, which manages the information of the media capable of backup.

The Accept Backup message 304 is sequentially received from many other media. In the example of FIG. 5, the total quantity of data that the own medium 101 has to back up is 10000 GB, and the acquired current total quantity of the backup data of the other media is 9800 GB, which shows that the media is not in a position to back up yet. In contrast to this, the example of the backup media management table 500 as shown in FIG. 6 shows that the media reaches a position to backup. That is, the acquired current total quantity of the backup data of the other media is 10800 GB, which exceeds the data capacity of the backup object, namely, the total quantity of data (10000 GB) that the own media 101 has to back up.

When the total capacity of the media being the backup recipient is not yet sufficient to the quantity of the backup data, the Request Backup message 303 is sent again to the medium listed as the candidate for the backup recipient, and the operation is repeated which receives the Accept Backup message 304 from the medium.

That is, the media registered in the media information management table 400 excluding the media registered in the backup media management table 500 in FIG. 5 are sequentially selected from the top of the management table 400, for example. The Request Backup message 303 is again sent to the medium selected by the above method, and the Accept Backup message 304 is received from the medium. The contents of the received Accept Backup message 304 and the relevant information are sequentially registered in the backup media management table 500 in FIG. 5. Each time when new media information is registered in the backup media management table 500, the total data capacity that can be used for the backup; and the total data capacity thus updated is compared with the quantity of data being the backup object. And, when the total data capacity that can be used for the backup exceeds the quantity of data being the backup object, it is recognized that the data capacity necessary for the backup is ensured. When it reaches this state, the data capacity more than this is unnecessary, and the Request Backup message 303 is not sent again.

As the total data capacity of the media that should be backed up is ensured, the backup data is sent to the other media being the backup object. This is carried out by the medium 101 sending a Deposit Backup message 306 for sending the backup data to the media registered in the backup media management table 500 in FIG. 6 (see FIG. 1E). Here, the Deposit Backup message 306 is composed of, as shown in FIG. 3F, the message type indicating the Deposit Backup, IP address of the own medium, physical location of data of the own medium or logical file name with absolute path, and backup data body. In this manner, the backup data is sequentially sent to the other media by the message 306 being sent. The other media having received the message 306 store the received backup data in the storage devices of the own media.

Figure 3G:
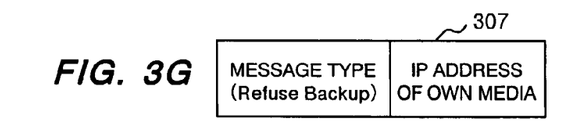

Now, as described above, the medium 101 receives the Accept Backup message 304, and the information of the media capable of backup is registered in the backup media management table 500 in FIG. 5 (or FIG. 6); then, it is possible that the free data capacity of the other media exceeds by far the data quantity that the medium 101 has to back up. In that case, the medium 101 sends the above Deposit Backup message 306 to the currently selected media as the backup recipient; however, the medium 101 sends a Refuse Backup message 307 to the other registered media than the selected ones. Thereby, the other media having received the Refuse Backup message 307 can recognize it unnecessary to prepare the backup for the medium 101. Accordingly, these media can provide the capacity ensured for the backup to the other media than the medium 101. Here, the Refuse Backup message 307 is composed of, as shown in FIG. 3G, the message type Refuse Backup and IP address of the own medium 101.

Now, as the message 306 is sent, the backup data is sequentially sent to the other media; as the backup processing is carried out, a detail (hereunder, mentioned as manifest) table 700 for the log control is created in the medium 101 being the source, which is archived in the nonvolatile memory 1104. A deposit table 800 is created in the other media having received the backup data, which is archived in the nonvolatile memory 1104. These tables 700, 800 may be archived in the recording medium 1105.

Referring to FIG. 7, the manifest table 700 registers the information of backup data map, transfer start time, transfer termination time, and success/failure flag in correspondence with the IP address of the medium being the transfer destination of the backup data. Here, the backup data map includes the information of logical volume number as the address where the backup data is stored, cylinder number, and track number. This example shows that the backup data is transferred to two media of different IP addresses.

Figure 1F:
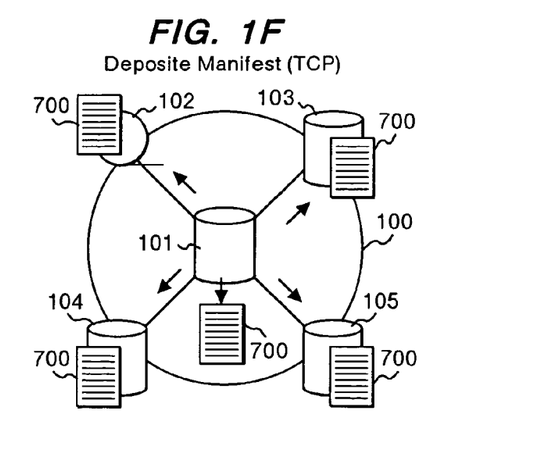

The manifest table 700 is retained in the nonvolatile memory 1104 of the own medium 101, and additionally, the table may be transferred to the other media 102 to 105 that transferred the backup data, as shown in FIG. 1F, and may be stored in the nonvolatile memory 1104 of the medium being the transfer destination; thus, both media may retain the table.

FIG. 8 illustrates a configuration of a deposit table 800 in the medium that accepted the backup. The deposit table 800 registers the information of backup data map, receive start time, receive termination time, and success/failure flag in correspondence with the IP address of the medium being the sending originator of the backup data. The example of FIG. 8 finds that the media having this deposit table 800 accepts the backup from two medium having different IP addresses.

Next, the method of restoring the data having been backed up will be described with reference to FIG. 2. As a premise, there occurs an abnormality in the medium 101, and the data of the media 101 are backed up in the media 102 to 105. The nonvolatile memory 1104 of the medium 101 retains the manifest table 700 for managing the backup data.

Now, the abnormality in the medium 101 is mended, and the restoration of the backup data will be made to the medium 101. The restoration mode starts with the input of restoration instruction by the system manager. When the medium 101 has a small capacity medium, the medium 101 may be put in the restoration mode when the small capacity medium is set.

Figure 2A:
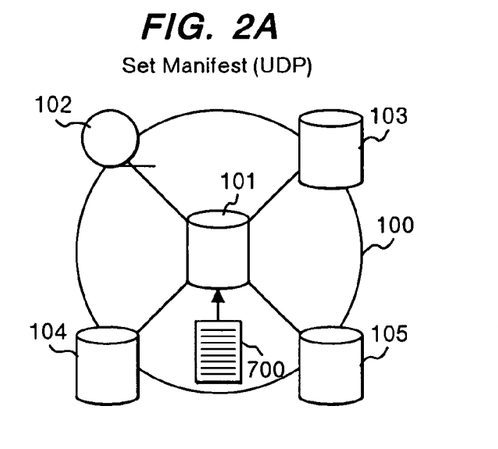
FIG. 2 illustrates the operational process of recovering backed-up data in the embodiment.
Figure 2B:
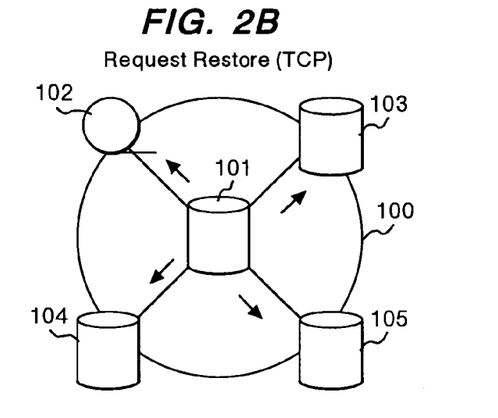
Figure 9A:
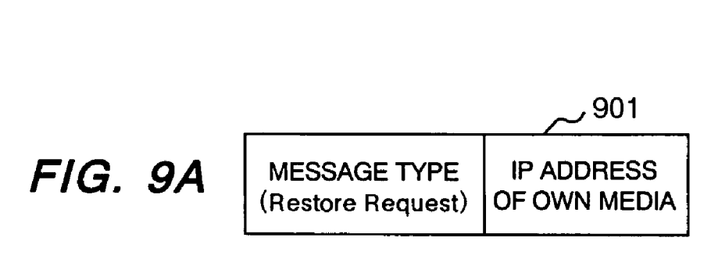
FIG. 9 illustrates the electronic mail protocol used for recovering the backed-up data in the embodiment.

First, as shown in FIG. 2A, the CPU 1101 of the medium 101 analyzes the contents of the manifest table 700. As a result of the analysis, to start the restoration, the medium 101 sends a Request Restore message 901 by means of the unicast, for example, to the other media having the IP address in the table 700 (see FIG. 2B). The Request Restore message 901 includes the message type Request Restore and IP address of the own medium 101, as shown in FIG. 9A.

Figure 2C:
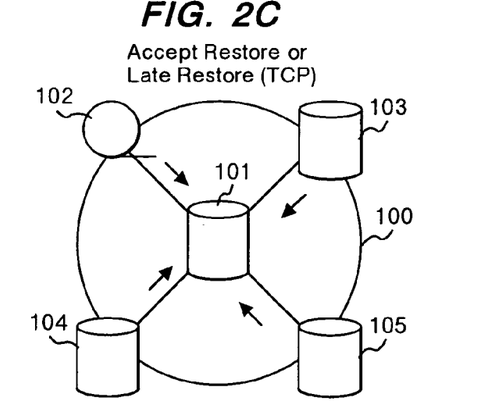
Figure 2D:
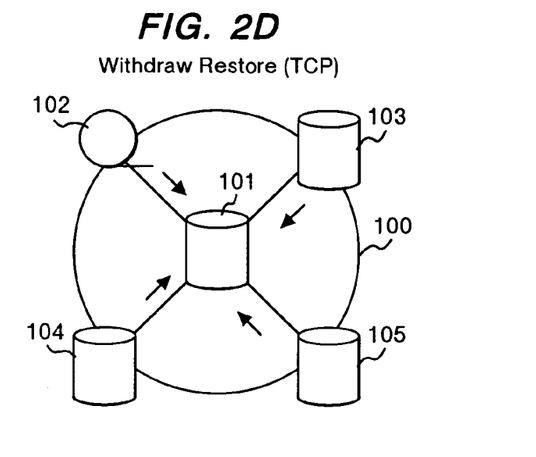
Figure 9B:
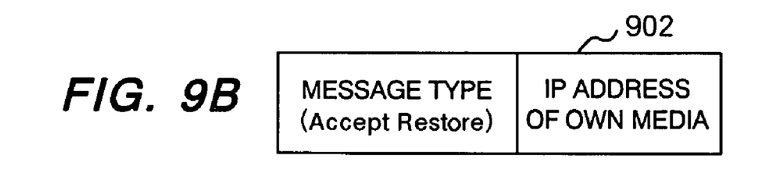
Figure 9C:
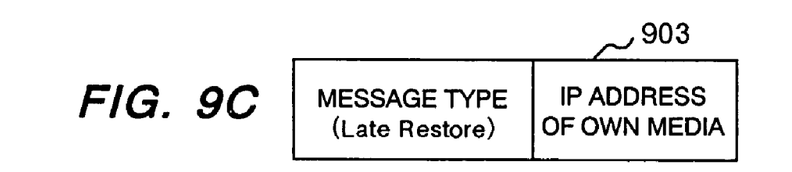

The other media that received the Request Restore message return an Accept Restore message 902 if it is possible to transfer the restoration information immediately; and if it is impossible to transfer the restoration information immediately, the other media return a Late Restore message 903, as shown in FIG. 2C. The address of the medium being the return destination can be identified with reference to the IP address contained in the Request Restore message. The Accept Restore message 902 includes the message type Accept Restore and IP address of the own medium 101, as shown in FIG. 9B. The Late Restore message 903 includes the message type Late Restore and IP address of the own medium 101, as shown in FIG. 9C.

Receiving the Accept Restore message 902 or the Late Restore message 903, the medium 101 creates a restoration management table 1000 (see FIG. 10), and retains it in the nonvolatile memory 1104. The restoration management table 1000 is the management table for acquiring and restoring the backup data, which registers the information of IP address of the media being the recipient of the backup data, backup data map, transfer start time, transfer termination time, and restorability flag. The IP addresses are the same as the one registered in the manifest table 700.

The backup data map shows the location where the backup data to be acquired is restored. This backup data map shows the physical location of data on the media in this example, however it may show the logical location with an absolute path. The restorability flag Y (possible) is given to the media that returned the Accept Restore message 902, and the flag N (impossible) is given to the media that returned the Late Restore message 903. In the example of FIG. 10, the restoration of the date from the media of the IP address '192.168.0.3' is completed, and the restoration of the date from the media of the IP address '192.168.0.4' is now being executed.

Figure 9D:
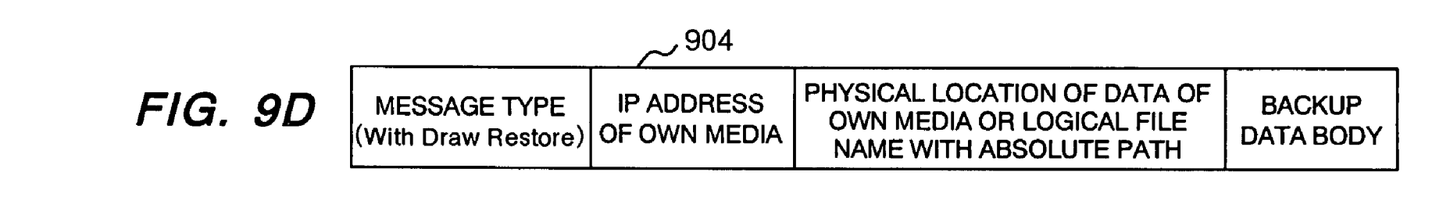

Next, the medium 101 waits for a Withdraw Restore message 904 being sent from the media that returned the Accept Restore message 902. The Withdraw Restore message 904 includes, as shown in FIG. 9D, the message type Withdraw Restore, IP address of the own medium, physical location of data of the own medium or logical file name with an absolute path, and backup data body.

Receiving the Withdraw Restore message 904, the medium 101 writes the start time of restoring the backup data, and the termination time of the restoration into the restoration management table 1000. To the media that returned the Late Restore message 903, the medium 101 sends the Request Restore message 901 at each constant time intervals by means of the unicast, for example.

In this manner, when the backup data is restored by the data from the media corresponding to the IP address in the restoration management table 1000, the start time and termination time of the table are all filled, and all the restorability flags become Y, the data restoration in the medium 101 is all completed. On the other hand, the other media 102 to 105 that completed transferring the backup data to the medium 101 delete the data being backed up from the recording medium 1105. Although not especially explained, the above embodiment may utilize the generally used encryption algorithm to encipher the backup data before the transfer of the backup data.

The above embodiment described that the memory to archive the manifest table 700 was the nonvolatile memory 1104. However, a medium such as a memory card may be used as the recording medium dedicated for the manifest table, instead of the nonvolatile memory 1104. In this case, the memory card should be detachable to the port to which the memory card is connected.

Further, it may be configured that, until the data restoration of the medium is completed, the contents of the memory cord of the own medium are set un-rewritable, and when the restoration is completed, the contents of the manifest table of the memory card are set rewritable again, thus automatically acquiring the backup management information with the preparation for an abnormality that can occur again in the future.

Further, it may be configured to create a restoration log based on the restoration management table 1000 in FIG. 10, and write it in a small-capacity medium that the own medium contains. By this configuration, when a certain medium detects an abnormal state by itself, the other media connected to the network accommodate free areas mutually automatically without intervention of operators, and the medium is able to back up the data inside the medium being in the normal state.

What is claimed is:

1. A method of backing up data stored on a first information processing unit, using plural second information processing units connected to a network, comprising the steps of:

sending autonomously a first message from the first information processing unit to the plural second information processing units, the first message inquiring as to a possibility of backing up the data stored on the first information processing unit to the plural second information processing units;

receiving second messages at the first information processing unit from said plural second information processing units that responded to the first message, said second messages containing information as to the possibility of backing up the data stored on the first information processing unit;

creating a first table on the basis of the second message by the first information processing unit, the first table managing at least information relating to the plural second information processing units capable of backing up the data, and retaining the first table at the first information processing unit;

distributing the data stored on the first information processing unit as backup data to selected second information processing units as recipients of the backup data, said selected second information processing units being selected by the first information processing unit from the first table by comparing an amount of data each of said second information processing units is capable of backing up to a total amount of the data on the first information processing unit to be backed up, and by sending portions of the backup data to the selected second information processing units based upon the amount of data each selected second information processing unit is capable of backing up;

creating a second table for managing information including an address of each of the selected second information processing units which is selected by the first information processing unit as a recipient of the backup data, and retaining the second table at the first information processing unit;

sending a third message by the first information processing unit referring to the second table, said third message requesting restoration of the backup data to the first information processing unit by requesting transfer of the backup data portions from the selected second information processing units, each of which was the recipient of the backup data portions;

receiving, by the first information processing unit, the backup data portions sent from the selected second information processing units; and storing the received backup data portions according to mapping information retained in the first information processing unit to restore the data stored at the first information processing unit.

2. The method of backing up data according to claim 1, wherein the second message includes a type of a medium that the second information processing unit possesses, a free capacity of the medium, and information as to whether a backup request can be accepted, and the first table registers an address that specifies each of the plural second information processing units that received the first message, the type of the medium, the free capacity of the medium, and the information as to whether the backup request can be accepted.

3. The method of backing up data according to claim 1, wherein the second table registers at least the address of each of the selected second information processing units to which the backup data portions were sent, and information indicating success or failure of the backup.

4. The method of backing up data according to claim 1, wherein each of the selected second information processing units that received one of said backup data portions from the first information processing unit creates and stores a third table that registers at least an address of the first information processing unit having been a sender of the backup data portion, and information indicating success or failure of the backup.

5. The method of backing up data according to claim 1, wherein, before sending the backup data portions to the selected second information processing units from the first information processing unit, the method includes the steps of:

selecting the plural second information processing units as a backup object with reference to the first table, and sending a backup request message to the selected plural second information processing units, said backup request message specifying a data capacity for the backup; and receiving a return message as to whether the backup request of the specified data capacity can be accepted or not from the selected plural second information processing units.

6. The method of backing up data according to claim 1, further including a step of when a total amount of data on the first information processing unit to be backed up exceeds a total amount of capacity available for backup on the plural second information processing units that responded to the first message, the first information processing unit repeats the first message to one or more additional second information processing units of the plural second information processing units.

7. The method of backing up data according to claim 1, further comprising a step of when a particular one of the selected second information processing units is unable to transfer its particular backup portion, the particular second information processing unit sends a response that restoring of the particular backup portion will be late.

8. The method of backing up data according to claim 7, wherein the first information processing unit periodically repeats the third message to the particular second information processing unit that sent the response that restoring of the particular backup portion will be late until the particular backup portion is restored.

9. The method of backing up data according to claim 1, further including a program stored on a computer readable medium said program causing the execution of the steps of the method according to claim 1.

10. A method of backing up data in a system including plural information processing units connected to a network, each of said information processing units autonomously sending and receiving data to and from multiple others of the information processing units for enabling backing up of data stored on each information processing unit to the multiple others of the information processing units connected to the network, the steps carried out by each particular information processing unit when backing up the data stored therein comprising:

collecting information by the particular information processing unit from the multiple other information processing units connected to the network as to a possibility of backing up data from that information processing unit to the multiple other information processing units;

adding addresses for identifying each of the multiple other information processing units from which the information is collected, and storing the collected information at the particular information processing unit;

sending, by the particular information processing unit, a backup request to selected multiple other information processing units, selected by the particular information processing unit on the basis of the collected information by comparing an amount of data that each of said selected multiple other information processing units is capable of backing up to a total amount of the data on the particular information processing unit to be backed up; and sending portions of the data on the particular information processing unit to the selected multiple other information processing units as backup data portions.

11. The method according to claim 10, further comprising steps of restoring the data on the particular information processing unit by the particular information processing unit sending a request to the selected multiple other information processing units requesting transfer of the backup data portions from the selected multiple other information processing units that were the recipients of the backup data portions;

receiving, by the particular information processing unit, the backup data portions sent from the selected multiple other information processing units; and storing the received backup data portions according to mapping information retained at the particular information processing unit to restore the data of the particular information processing unit.

12. The method according to claim 10, further comprising a step of retaining the collected information in a non-volatile memory of the particular information processing unit, wherein the collected information includes the addresses for identifying the multiple other information processing units and a media type of the multiple other information processing units.

13. The method according to claim 10, further including a step of
selecting said selected multiple other information processing units at least partially on a basis of having a same media type as the particular information processing unit.

14. The method according to claim 10, further including a step of
when a total amount of data on the first information processing unit to be backed up exceeds a total amount of capacity available for backup on the multiple other information processing units that responded to the first message, the particular information processing unit repeats the first message to one or more additional other information processing units of the plural information processing units.

15. The method according to claim 10, further including a step of
autonomously creating a table by each of the plural information processing units in the system, the table being created from the collected information collected by each particular information processing unit and including a type of a medium that each of the other information processing units possess, a free capacity of the medium, and information as to whether a backup request can be accepted by the other information processing units, and
determining a size of the backup data portions sent to the selected other information processing units based upon the amount of data each selected other information processing unit is capable of backing up.

16. A system comprising plural information processing units connected to a network, each of said information processing unit being capable of autonomously sending and receiving data to and from multiple others of the plural information processing units for backing up data stored on each of the information processing units, each of said information processing units comprising:
a CPU that executes data processing;
a recording medium that stores data processed by the CPU; and
a communication port connected to the network and paths to connect the information processing units,
wherein the communication port sends a first message for acquiring state information of the other plural information processing units connected to the network, and receives second messages sent from the other plural information processing units, said second messages including information as to a possibility of backing up the data of the information processing unit to the other plural information processing units,
wherein the memory or the recording medium retains a first table, created on the basis of the second messages, that manages information relating to the other plural information processing units being at least capable of backing up the data of the information processing unit;
wherein, when an abnormal state in the information processing unit is detected, the CPU autonomously selects others of the plural information processing units to be the recipients of backup data from the information processing unit by referring to the first table and comparing an amount of data each of the other plural information processing units is capable of backing up to a total amount of the data on the information processing unit to be backed up, issues a backup request to the selected other information processing units, and executes processing for sending portions of the data stored in the recording medium as backup data portions to the selected other information processing units that accepted the backup request.

17. The system according to claim 16,
wherein, to restore the data of the information processing unit, the CPU requests transfer of the backup data portions from the selected other information processing units that became the recipients of the backup data portions;
the communication port receives the backup data portions sent from the selected other information processing units; and
the recording medium stores the received backup data portions, whereby the data of the information processing unit is restored,
wherein the memory or the recording medium stores a restoration management table for correctly restoring the received portions of the data according to mapping information.

18. The system according to claim 16,
wherein each of the plural information processing units in the system autonomously creates one of said first tables, each said first table containing state information of the other information processing units in the system, the first table being created from collected second messages received by each particular information processing unit in response to said first messages sent by that particular information processing unit, said first table including a type of a medium that each of the other information processing units possess, a free capacity of the medium, and information as to whether a backup request can be accepted by the other information processing units.

19. The system according to claim 16,
wherein, when a total amount of data on the information processing unit to be backed up exceeds a total amount of capacity available for backup on the other plural information processing units that responded to the first message, the information processing unit repeats the first message to one or more additional other information processing units of said plural information processing units.

20. The system according to claim 16,
wherein a size of the backup data portions sent to the selected other information processing units is based at least in part on the amount of data each of the selected other information processing units is capable of backing up.

* * * * *